United States Patent [19]
Allcock

[11] Patent Number: 5,467,121
[45] Date of Patent: Nov. 14, 1995

[54] METHOD AND APPARATUS FOR DOT MATRIX WRITING USING A CONTINOUS WAVE LASER

[75] Inventor: Geoffrey Allcock, Kirkella, England

[73] Assignee: Coherent Hull, Ltd., United Kingdom

[21] Appl. No.: 289,843

[22] Filed: Aug. 12, 1994

Related U.S. Application Data

[63] Continuation of Ser. No. 856,075, filed as PCT/GB91/01770, Oct. 11, 1991.

[51] Int. Cl.⁶ .................................................. B41J 2/43
[52] U.S. Cl. .................................................. 347/260
[58] Field of Search .................... 346/1.1, 107 R, 346/108, 160, 76 L; 358/296, 300, 302; 347/134, 137, 241, 242, 243, 244, 256, 257, 258, 259, 260, 261

[56] References Cited

U.S. PATENT DOCUMENTS

| | | | |
|---|---|---|---|
| 3,626,321 | 12/1971 | Smith | 359/161 |
| 3,964,032 | 6/1976 | Bardos | 340/173 |
| 4,156,555 | 5/1979 | McMahon | 350/3.75 |
| 4,704,521 | 11/1987 | Loy | 250/203 |
| 4,908,708 | 3/1990 | Kuroda | 358/206 |
| 4,953,927 | 9/1990 | Vedder | 350/6.8 |

FOREIGN PATENT DOCUMENTS

| | | |
|---|---|---|
| 0285097 | 10/1988 | European Pat. Off. . |
| 37438937A1 | 7/1989 | Germany . |
| 1-269969 | 10/1989 | Japan . |
| 2135789 | 9/1984 | United Kingdom ........... G02B 27/17 |
| 2229017 | 9/1990 | United Kingdom ............. G02B 5/10 |

*Primary Examiner*—Mark J. Reinhart
*Attorney, Agent, or Firm*—Limbach & Limbach

[57] ABSTRACT

A method and apparatus for writing bits (or pixels) on a target by scanning a continuous wave laser beam across an array of concave mirrors. The radiation reflected from the concave mirror array images a row of stationary dots on the target during each scan. To write a dot matrix pattern, after each row of dots is written on the target, the target is translated (perpendicularly to the row of dots) by an increment, and another row of dots is then written on the target. The laser beam can be modulated while it is scanned across the concave mirror array, for example, by being selectively transmitted through a shutter. Preferably, the beam is swept across the concave mirror array by reflecting from a rotating mirror (which can be flat or polygonal with multiple facets). In a class of preferred embodiments of the invention, lines of variable length and width (rather than dots) are written on the target. This is accomplished by scanning the continuous wave laser beam across a system of variable lenses. The scan is accomplished by reflecting the beam from a rotating mirror, so that a swept beam transmitted through the lens system is projected as a line on the target.

74 Claims, 5 Drawing Sheets

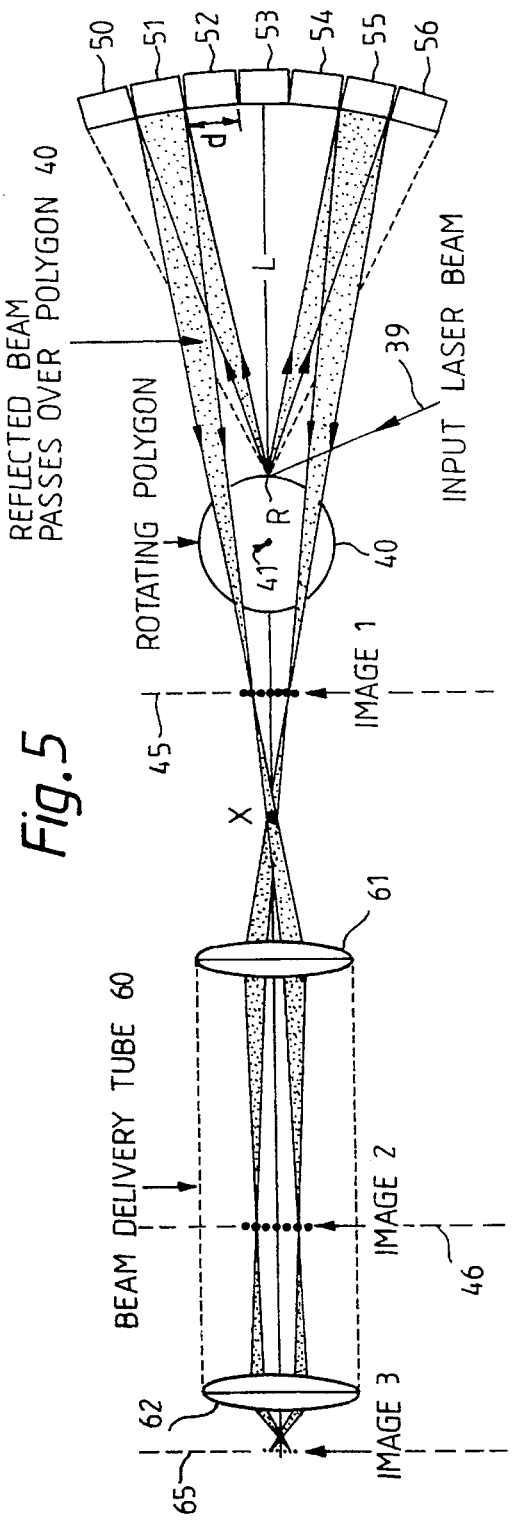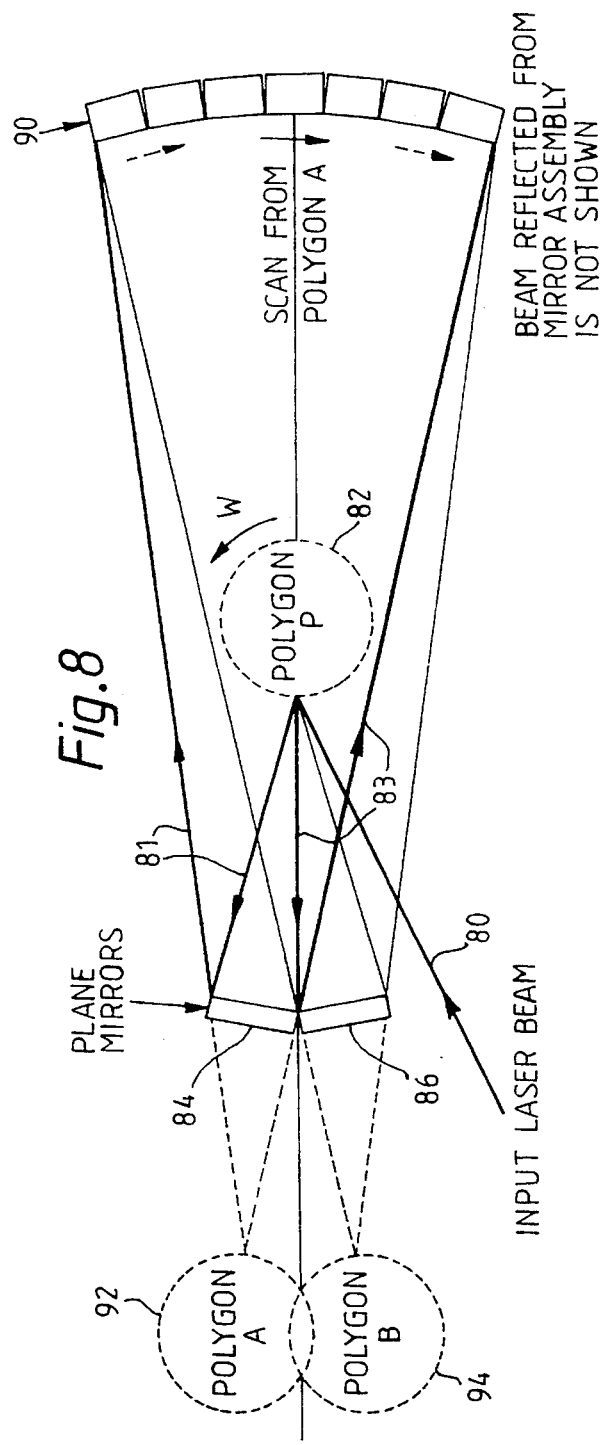

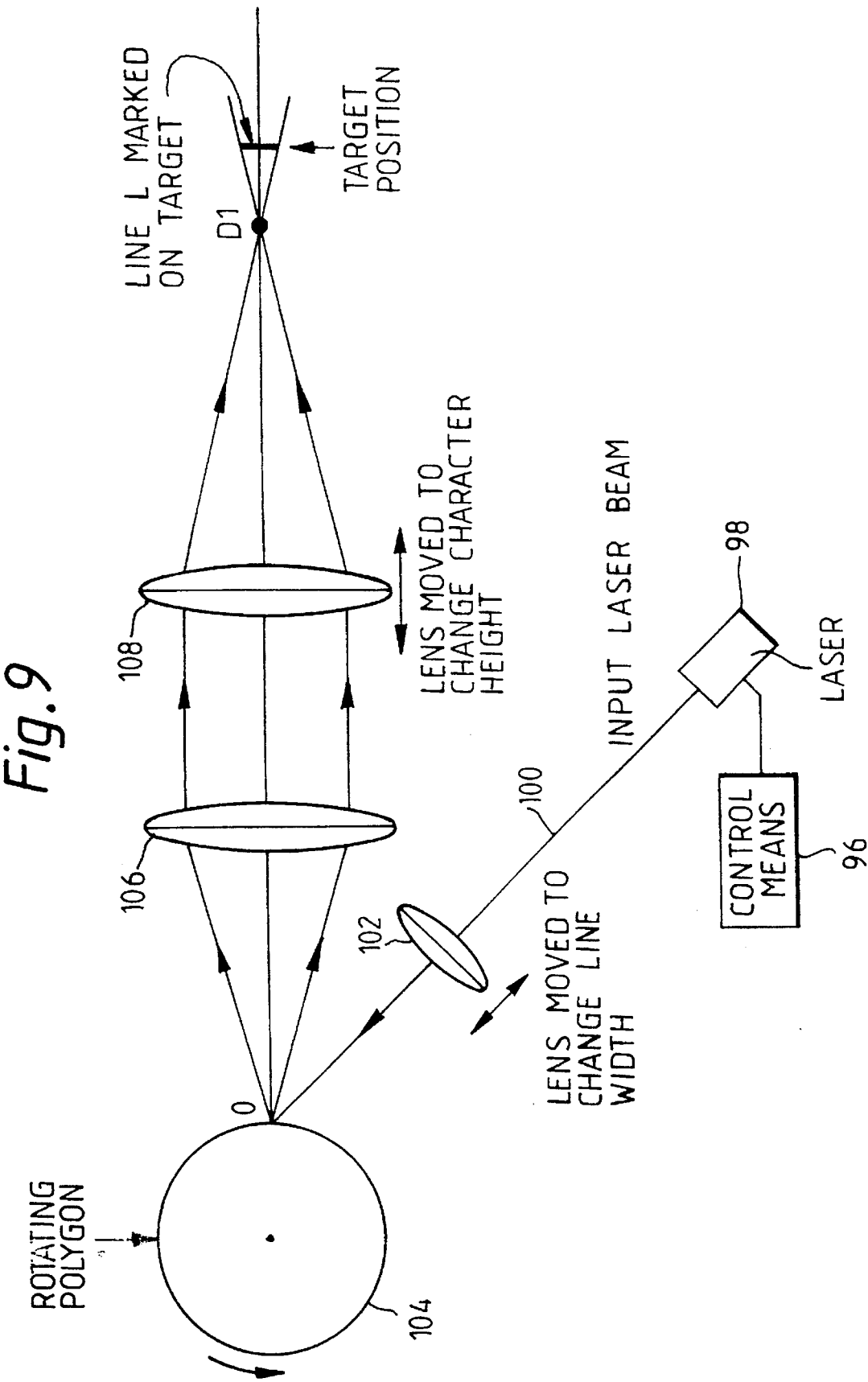

COLUMN  1  2  3  4  5

METHOD AND APPARATUS FOR DOT MATRIX WRITING USING A CONTINOUS WAVE LASER

This is a continuation of application Ser. No. 07/856,075 filed as PCT/GB91/01770, on Oct. 11, 1991.

FIELD OF THE INVENTION

The invention pertains to methods and apparatus for writing a dot matrix pattern using a continuous wave laser beam. More particularly, the invention pertains to methods and apparatus for writing a dot matrix pattern by scanning a continuous wave laser beam across an array of concave mirrors.

BACKGROUND OF THE INVENTION

High power continuous wave (CW) laser beams can be employed to write information on a variety of materials, since when such beams are focused to small diameter spots, they can produce surface marks on the materials. When arranged into dot matrix patterns, these marks become optically readable digital bit arrays, or recognizable images such as alpha-numeric characters.

In one conventional technique for writing data using a CW laser beam, the beam is scanned using a moving mirror. The mirror is moved to direct the beam to a first spot, and then stopped while the beam writes a bit on the first spot area. Then the mirror is again activated to direct the beam to a second spot, and the mirror is again stopped while the beam writes a bit on the second spot area.

However, this technique suffers from the serious disadvantage that it is very slow, due to the time needed to accelerate the mirror periodically from rest (to redirect the beam) and to decelerate the mirror periodically to zero velocity (so that the mirror remains stationary for the required dwell time at each spot area).

Another conventional technique for writing data using a laser beam employs a continuously rotating mirror to project a pulsed CW laser beam along a linear (or raster) scan path on a sample. Flat rotating mirrors, and polygonal rotating mirrors (having multiple flat facets), have been employed to implement this conventional technique. For example, systems which employ a rotating polygonal mirror for this purpose are described in U.S. Pat. No. 3,750,189, issued Jul. 31, 1973, in U.S. Pat. No. 4,040,096, issued Aug. 2, 1977, and in U.S. Pat. No. 4,433,894, issued Feb. 28, 1984.

However, conventional systems using rotating mirrors have a number of serious limitations and disadvantages. One such disadvantage is that to write clearly defined dots on the sample, short exposure times must be used. This limits the practical applications of the technique to cases in which dots are written on a photosensitive surface, or in which dots are written by an extremely high peak power beam capable of marking the sample after only a very short exposure.

Another conventional technique for dot matrix writing uses an acousto-optic deflector to steer, hold, and modulate a CW carbon dioxide laser beam. Such a technique is described in United Kingdom Patent Application No. 2,133,352A. However, suitable acousto-optic deflectors are very expensive. Furthermore, they are limited in the maximum laser power they can transmit, and result in high insertion power loss (and loss of useful power in an undeflected zero order beam transmitted therethrough).

SUMMARY OF THE INVENTION

In a class of preferred embodiments, the invention is a method and apparatus for writing bits (or pixels) on a target by scanning a continuous wave laser beam across an array of concave mirrors. The radiation reflected from the concave mirror array images a row of stationary dots on the target during each scan. To write a dot matrix pattern, after each row of dots is written on the target (i.e., after each scan across the concave mirror array), the target is incrementally translated (perpendicular to the row of dots), and another row of dots is then written on the target. The laser beam can be modulated while it is scanned across the concave mirror array, for example, by being selectively transmitted through a shutter.

Preferably, the beam is swept across the concave mirror array by reflecting it from a rotating mirror (which can be a single flat mirror or a polygon having multiple reflecting facets). If the concave mirror array includes N concave mirrors, a row of N dots is written on the target each time the beam sweeps across the concave mirror array.

In a preferred embodiment, each mirror in the concave mirror array is a spherical concave mirror. A collimating lens system can be employed to compress in size each dot imaged in the target plane.

To increase the number of dots imaged during each scan, a secondary set of mirrors can be interposed between the rotating mirror and the concave mirror array.

In a class of preferred embodiments of the invention, lines of variable length and width (rather than dots) are written on the target. This is accomplished by scanning the continuous wave laser beam across a system of variable lenses (rather than across a concave mirror array). The scan is accomplished by reflecting the beam from a rotating mirror or multifaceted polygon, so that a swept beam transmitted through the lens system is projected as a line on the target. The length of each projected (i.e., written) line is varied by adjusting the lens system or modulating the input laser beam (for example, by selectively switching it on and off) during a scan. The width of each written line is adjusted by varying the position of a lens mounted between the laser beam source and the rotating mirror.

BRIEF DESCRIPTION OF THE DRAWINGS

In FIG. 4, distance toward the right from the vertical axis represents time, and distance away from the horizontal axis represents voltage.

FIG. 5 is a schematic diagram of a second preferred embodiment of the inventive apparatus.

FIG. 8 is a schematic diagram of a third preferred embodiment of the inventive apparatus.

FIG. 9 is a schematic diagram of a fourth preferred embodiment of the inventive apparatus.

In FIG. 11, distance toward the right from the vertical axis represents time, and distance away from the horizontal axis represents voltage.

DETAILED DESCRIPTION OF THE PREFERRED EMBODIMENT

Figure 1:
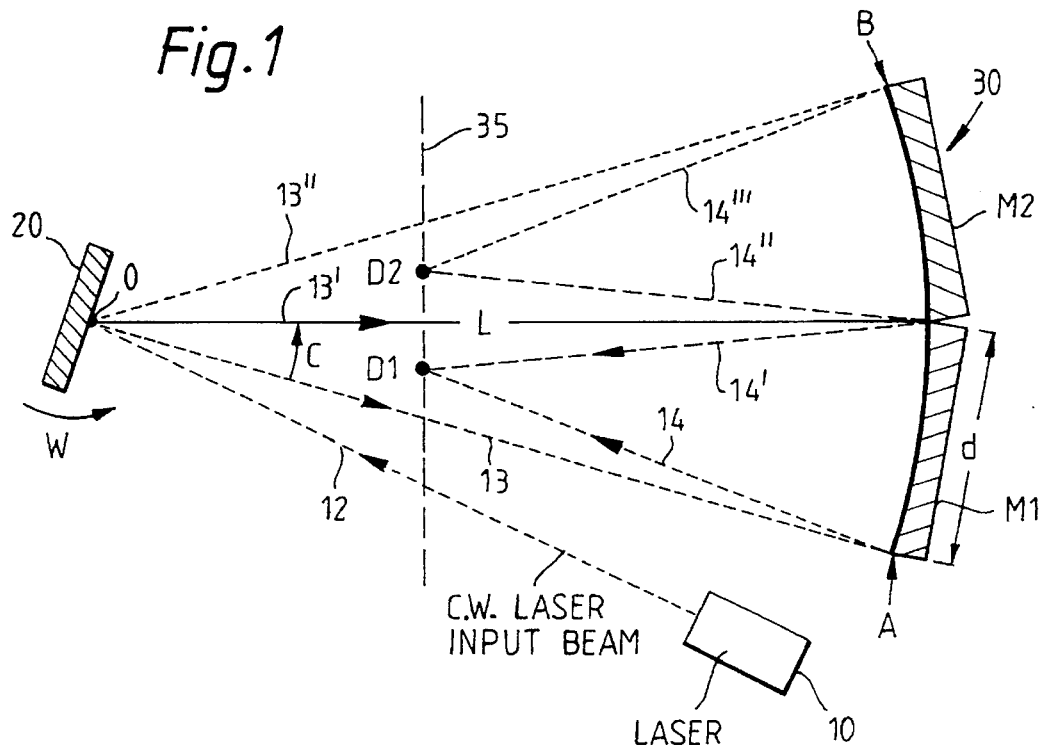
FIG. 1 is a schematic diagram of a first preferred embodiment of the inventive apparatus.

A first embodiment of the invention will be described with reference to FIG. 1. As shown in FIG. 1, laser 10 produces continuous wave laser beam 12, and directs beam 12 toward rotating flat mirror 20. While mirror 20 rotates counterclockwise (about an axis perpendicular to the plane of FIG. 1), beam 12 is incident on mirror 20 at point O. Reflected beam 13 propagates away from point O toward mirror array 30. As mirror 20 rotates, the projection of reflected beam 13 on mirror array 30 sweeps across a path from point A to point B on the surface of array 30.

Mirror array 30 is shown to consist of two spherical concave mirrors M1 and M2 (however, variations on this embodiment of mirror array 30 can employ more than two concave mirrors). Each of mirrors M1 and M2 has diameter d in the plane of FIG. 1. During the entire time that mirror 20 rotates counterclockwise from the position shown in FIG. 1 through angle C shown in FIG. 1, mirror M1 redirects the radiation in the sweeping beam 13 to form a real image of point O at point D1 in target plane 35 (target plane 35 is perpendicular to the plane of FIG. 1). Thus, a target positioned in plane 35 will be marked with a dot at point D1 (i.e., the dot will be "written" or "printed" on the target).

When mirror 20 is in the position shown in FIG. 1, radiation in beam 13 reflects from mirror M1 as a twice reflected beam 14. Beam 14 is incident at point D1. When mirror 20 has rotated counterclockwise by the angle C, radiation in beam 13 reflects from mirror M1 as a twice reflected beam 14' which is also incident at point D1. Thus, it will be appreciated that a stationary laser spot will exist at point D1 during the entire time that beam 13 sweeps across mirror M1.

When mirror 20 has rotated sufficiently far so that reflected beam 13 propagates along path 13' (referred to below as beam 13') from point O to mirror M2, radiation in beam 13' reflects from mirror M2 as a twice reflected beam 14" which is incident at point D2 in target plane 35. When mirror 20 has rotated sufficiently far so that reflected beam 13 propagates along path 13" (referred to below as beam 13") from point O to mirror M2, radiation in beam 13" reflects from mirror M2 as a twice reflected beam 14"' which is also incident at point D2. Thus, it will be appreciated that a stationary laser spot exists at point D2 during the entire time that beam 13 sweeps across mirror M2.

Thus, the invention enables distinct, spatially separated spots D1 and D2 to be marked on a target positioned in (or near) target plane 35, by reflecting continuous beam 12 from continuously rotating mirror 20 and stationary concave mirror array 30. Typically, a target to be marked will be positioned at (or very near to) target plane 35, to minimize the diameter of the spots marked thereon (and thus maximize the laser energy per unit area absorbed by the target).

The dwell time of the reflected beam on each of dots D1 and D2 is given by the expression:

$$T = d/[2Lw],$$

where d is the diameter of each of mirrors M1 and M2, w is the angular velocity of mirror 20 in radians per second, and L is the distance between point O (on mirror 20) and the surface of each of mirrors M1 and M2.

Thus, one convenient way to adjust the dwell time (to match the characteristics of the target being marked) is to change the angular velocity of rotating mirror 20.

Figure 2:
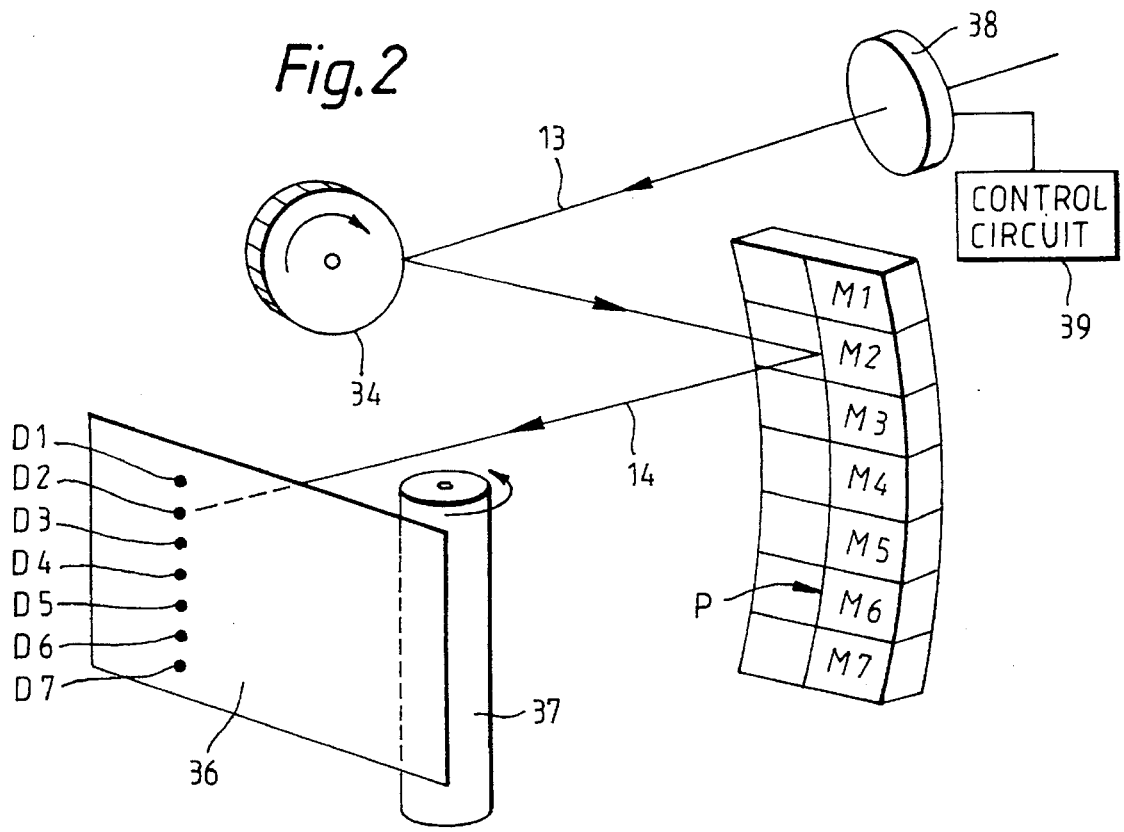
FIG. 2 is a simplified perspective view of a portion of another embodiment of the inventive apparatus.

In a variation of the FIG. 1 apparatus shown in FIG. 2, the inventive concave mirror array includes seven identical concave mirrors, M1 through M7, each of which can be identical to mirror M1 (or M2) of FIG. 1. Rotating mirror 34 sweeps laser beam 13 along path P across the mirrors M1 through M7, thus producing a reflected beam 14. Mirrors M1 through M7 are mounted end-to-end, in positions for projecting reflected beam 14 sequentially onto seven equally spaced, collinear spots D1 through D7 on target 36 in a target plane. For convenience, we will refer to the line along which spots D1–D7 are arranged as a "vertical" column.

Friction roller 37 engages target 36, and is driven so as to rotate intermittently (for example by a motor, not shown in FIG. 2). Each time roller 37 rotates counterclockwise about its longitudinal axis, it translates target 36 horizontally by an increment. If beam 13 is switched off during periods in which roller 37 is in motion, and is switched on and modulated (by beam modulation device 38) while roller 37 is stationary, the FIG. 2 apparatus can be used to write regularly spaced columns of dots on target 36 (with each column consisting of seven dots). The effective space between each written column can be increased by incrementing roller 37 as required before turning on beam 13.

Figure 3:
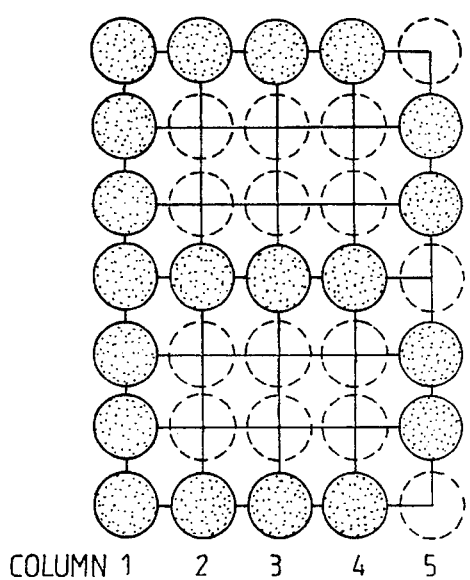
FIG. 3 is a diagram of a dot pattern of the type that can be written using a variation of the FIG. 2 apparatus.

For example, by turning beam 13 on (and modulating it) for one scan period after each of five sequential steps of roller 37, the FIG. 2 apparatus can write the pattern of dots shown in FIG. 3. The FIG. 3 dot pattern consists of selected dots representing the letter "B" from an (5 column)×(7 row) dot array.

Figure 4:
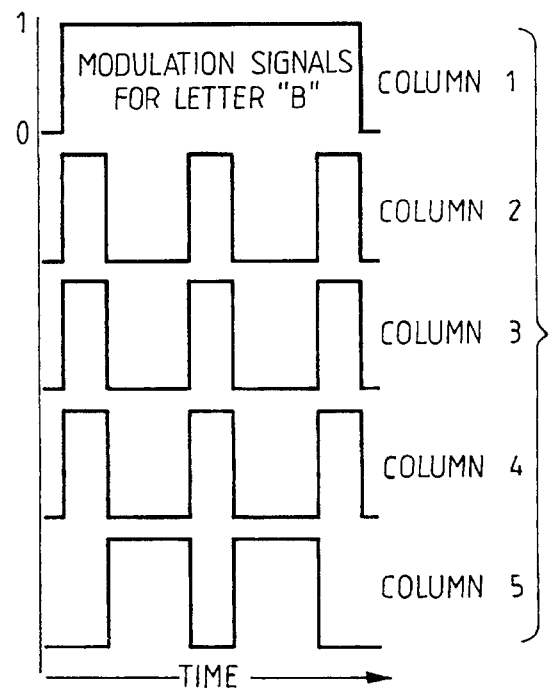
FIG. 4 is a graph of five signals of the type employed to modulate an input laser beam to produce the dot pattern of FIG. 3.

Beam 13 is modulated by modulation device 38, which can be a shutter (such as an acousto-optic, electro-optic, or magneto-optic cell). Specifically, device 38 selectively transmits beam 13 in response to control signals it receives from external control circuit 39. FIG. 4 shows graphs of five such control signals, each to be transmitted to device 38 during the process of writing one column of the FIG. 3 pattern. In response to the control signal at the top of FIG. 4, device 38 remains in a transmissive state, so that all seven dots comprising a column are written on the target. In response to the second, third, and fourth control signals from the top in FIG. 4, device 38 is in a transmissive state only at times when beam 13 is projected on mirrors M1, M4, and M7, so that only three dots are written on the target in each of columns 2, 3, and 4 of FIG. 3. In response to the bottom control signal in FIG. 4, device 38 is in a transmissive state only when beam 13 is projected on mirrors M2, M3, M5, and M6, so that only the four indicated dots in column 5 of FIG. 3 are written on the target.

The preferred embodiment shown in FIG. 5 includes rotating polygonal mirror 40 (rather than single plane mirror 20), from which input laser beam 39 reflects onto a concave mirror array comprising concave mirrors 50, 51, 52, 53, 54, 55, and 56 (and optionally additional concave mirrors not shown). Beam 39 reflects from a point R on the surface of each reflective facet of mirror 40. As mirror 40 rotates about axis 41 (which extends perpendicularly to the plane of FIG. 5), each facet of mirror 40 produces a separate scan across the entire concave mirror array. For example, if mirror 40 has twenty-four reflective facets, it will sweep the beam twenty-four times across the concave mirror array per revolution.

In FIG. 5, mirror 40 is located into the page with respect to mirrors 50–56 (which are located in the plane of FIG. 5). Thus, mirror 40 is located outside the path of the beam which reflects sequentially from mirrors 50–56. The reflected beams will propagate, in the plane of FIG. 5, to target plane 45 (oriented perpendicularly to the plane of FIG. 5) without encountering mirror 40. During each scan across the concave mirror array, the reflected beam will form a stationary, real image of point R at each of a sequence of points in target plane 45. Thus, a target positioned in plane 45 will be marked sequentially with a column of stationary dots.

In one embodiment, the total scan angle (through which each facet of mirror 40 sweeps the beam) is thirty degrees. By careful choice of d (the diameter of each concave mirror in the concave mirror array) and L (the distance between point R on mirror 40, and the surface of each concave mirror), the total scan angle can be matched to the physical dimensions of the concave mirror array. This allows one scan to immediately follow another, in order to maximize the speed at which the apparatus can write columns of dots on a target. By skipping facets of mirror 40, for example by turning off input beam 39 during unwanted scan periods, the space between each column of written dots can be increased. This permits adjustment of the width of each character represented by the dots.

It will be apparent to those familiar with the image-forming properties of lenses and mirrors that the stationary dots imaged by the inventive apparatus can be re-imaged by additional lenses or mirrors, in order conveniently to deliver the laser energy to a production line on which the target product is mounted. In particular, the diameter of the dots written on the target can be reduced using lenses, and hence the energy per unit area increased to a level sufficient to mark the target surface. This diameter reduction will also reduce the height of each written character, but an important feature of the invention is the ability to separately adjust the size of the space between dots of a written character without affecting the dot size. This allows larger characters to be written while maintaining a desired writing speed. The space between the dots in a column can be adjusted by steering the concave mirror array (in a manner to be explained below with reference to FIGS. 6 and 7).

For beam delivery systems of useful length, a collimating lens system is required. Thus, the beam delivery apparatus of the FIG. 5 apparatus (including lenses 61 and 62, and beam delivery tube 60) includes a collimating lens. The reflected beams from mirrors 50–56 cross the optical axis at point X. Since point X occurs just beyond plane 45, the overlapping, moving reflected beams appear as a small blurred spot at point X. Lens 61 collimates the radiation incident thereon by forming an image of this blurred spot at infinity (or if required, at the center of lens 62). The collimated radiation passes from lens 61 to lens 62 through tube 60.

Lens 61 reimages the stationary dot pattern (the "first" image in plane 45) to produce a "second" image in plane 46. The second image is again re-imaged by lens 62 to produce a "third" image in plane 65. The magnification of each of lenses 61 and 62 is typically chosen so that the size of the third image is much smaller than that of the first image. The target can be positioned in plane 65.

Figure 6:
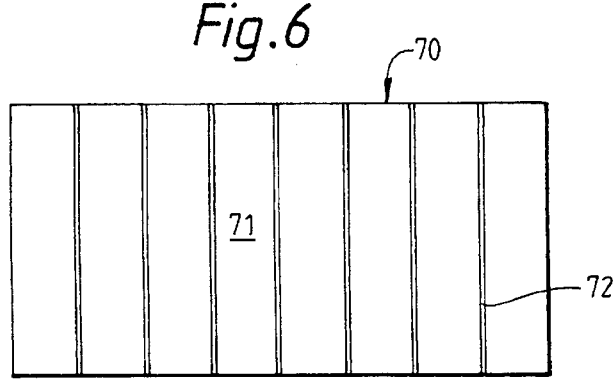
FIG. 6 is a view of the optical surface of a preferred embodiment of a concave mirror array useful in several embodiments of the invention.
Figure 7:
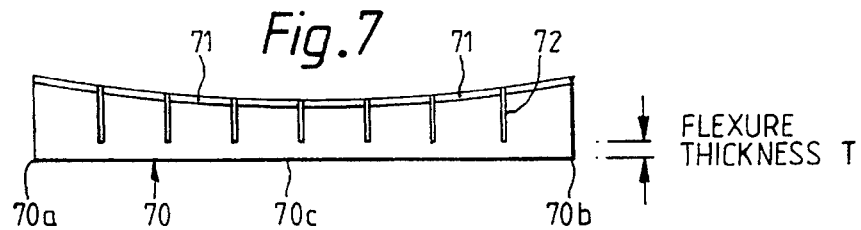
FIG. 7 is a side view of the concave mirror array of FIG. 6.

A concave mirror array useful for simplifying alignment of the inventive apparatus, and for reducing its cost, will be described next with reference to FIGS. 6 and 7. As shown in FIGS. 6 and 7, single mirror element 70 has a concave front surface which is coated with a highly reflective layer 71. Layer 71 can be polished gold, with the remainder of element 70 being composed of copper. Element 70 defines the required number of individual concave mirrors by a corresponding number of parallel grooves cut into its front surface. FIGS. 6 and 7 show seven parallel grooves 72 cut into the concave front surface, which define eight separate concave mirrors (although in general, any number of grooves N could be provided, to define N+1 separate concave mirrors). Grooves 72 are preferably cut into element 70 before it is polished and coated with layer 71.

Grooves 72 do not extend through the back portion of element 70 having thickness T. The thickness T is chosen so that the back portion is flexible, so that end portions 70a and 70b of element 70 can be flexed downward relative to center portion 70c. By flexing ("steering") the array in this manner, the spacing between adjacent dots in the column can be controlled, without significantly varying the size of each dot.

In the absence of bending force on element 70, element 70 will project only a single dot on a target when a beam is scanned across it. However, if end portions 70a and 70b are bent slightly downward relative to portion 70c, each of the eight separate mirrors defined by element 70 will mark a stationary dot on a target when a beam is scanned across element 70. Thus, flexed element 70 is useful for writing a column of eight dots on the target. Because of the way in which element 70 is free to flex, the column of dots will always remain aligned on a line perpendicular to the direction of each groove 72, even when the degree of flexure is varied to change the inter-dot spacing. This simplifies alignment and mounting of element 70, since the inter-dot separation can be adjusted first, and then the column of dots steered as a unit relative to the other optical components of the inventive apparatus.

The invention enables a CW laser to write columns of dots at a repetition rate which depends only on the speed of rotation of a rotating mirror (i.e., polygonal mirror 40 in FIG. 5). The dot generation rate can be significantly greater than the maximum modulation frequency of an R.F. excited carbon dioxide laser. The maximum modulation frequency needed to write an alpha-numeric character using the inventive apparatus is approximately half the modulation frequency that a conventional scanning system would require to write individual dots sequentially.

This enables useful writing speeds to be obtained by directly modulating the R.F. supplied to an R.F. excited carbon dioxide laser. Although (as explained above with reference to FIGS. 2–4) a modulation device (such as device 38 of FIG. 2) positioned in the path of the laser's output beam can be employed to write a character such as that of FIG. 3, for most applications it will be preferable to directly modulate the laser itself (such as by modulating input power to the laser. This latter technique is generally much less expensive, and enables use of laser beams having power above the level which would damage an external modulation device (such as device 38). Thus, the invention enables high power lasers to be employed to write at useful speeds on surfaces that are difficult to mark.

Another technique for increasing the number of dots written during each scan of the inventive concave mirror array will be described next with reference to FIG. 8. In FIG. 8, input laser beam 80 initially reflects from rotating polygonal mirror 82 (which rotates counterclockwise at a rotational speed w). Beam 80 reflects from mirror 82 along path 81 to array 90 of concave mirrors.

As mirror 82 continues to rotate, the beam reflected from a first facet thereof is scanned downward across mirror 84

(and hence downward across concave mirror array 90). At the end of this "first" scan across mirror 84, the reflected beam propagates along path 83 to the bottom of array 90. During the entire first scan, the beam (not shown) that re-reflects from array 90 will write a column of stationary dots on a target. The first scan originates from what appears (to array 90) to be a rotating polygonal mirror 92. However, mirror 92 is only a virtual image of mirror 82.

The beam reflected from the same facet of mirror 82 (as mirror 82 continues to rotate), is next scanned downward across mirror 86 which is positioned in order to repeat the downward scan across concave mirror array 90 a second time. At the end of this "second" scan across mirror 86 and array 90, the reflected beam is incident at the bottom of array 90. During the entire second scan, the beam (not shown) that re-reflects from array 90 will write a column of stationary dots on a target. The second scan originates from what appears (to array 90) to be a rotating polygonal mirror 94. However, mirror 94 is in fact only a virtual image of mirror 82.

Since virtual mirrors 92 and 94 are physically separated, the column of dots written during the first scan is physically separated from the column written during the second scan. However, by adjusting mirrors 84 and 86, these two columns of dots can be positioned to form a single long column (consisting of twice as many dots as the column produced during the first or second scan).

Additional plane mirrors can be mounted adjacent to mirrors 84 and 86, to produce additional columns of dots associated with each facet of mirror 82. For example, if a set of three plane mirrors is substituted for mirror pair 84, 86, three columns of dots will be written on the target using radiation reflected from a single facet of mirror 82.

Each of the embodiments described is for marking stationary dots on a target. Another embodiment of the invention, to be described below with reference to FIG. 9, is capable of writing lines of variable length and width on a target. In FIG. 9, laser 98 generates input laser beam 100 under control of control circuit 96. Beam 100 is focused by lens 102, and then reflects from point O on a facet of rotating polygonal mirror 104. While mirror 104 rotates counter-clockwise (about an axis perpendicular to the plane of FIG. 9), the reflected beam propagates away from point O and scans across collimating lens 106. The scanned, reflected beam propagates through lens 106 and then scans across lens 108. As the beam propagates through lens 108, lens 108 forms a real image of point O at point D1 along the optical axis.

A stationary laser spot exists at point D1 during the time taken by the beam to scan across lens 108. However, a target positioned just beyond point D1 is marked with a line during this time. The length of this line can be increased (or decreased) by positioning the target farther from (or nearer to) point D1.

Lens 102 and 108 are translatably mounted, so that their position along the optical axis can be varied. The length of the line marked on a fixed target can be increased (or decreased) by moving lens 108 along the optical axis to position point D1 farther from (or nearer to) the target. By operating control means 96 to modulate the input beam, the line can be broken up into short lines and spaces. When writing very small characters (i.e., with point D1 very near to the target), such short lines will appear to be dots.

Figure 10:
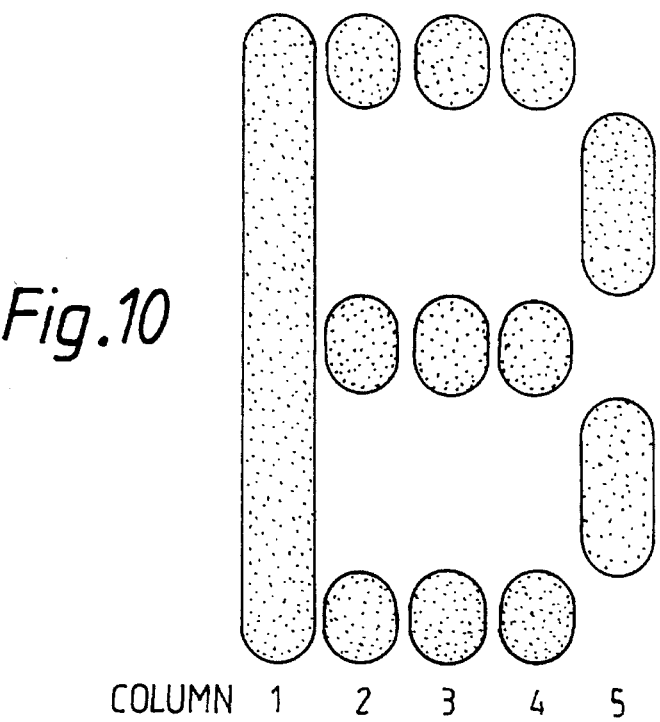
FIG. 10 is a diagram of a pattern of the type that can be written using a variation of the FIG. 9 apparatus.

By stepping the target five times in an orthogonal direction, and writing a pattern of lines with the target in each of the five target positions, the FIG. 9 apparatus can write the pattern shown in FIG. 10. The FIG. 10 pattern consists of five columns of lines having selected length, which together represent the letter "B."

Figure 11:
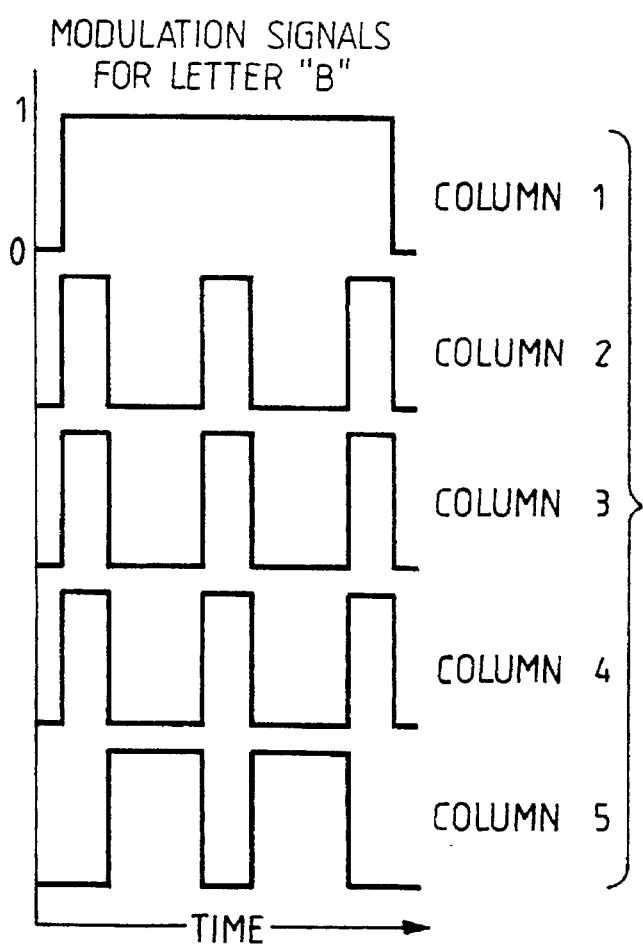
FIG. 11 is a graph of five signals of the type employed to modulate an input laser beam to produce the dot pattern of FIG. 10.

To write the character shown in FIG. 10, beam 100 is modulated by switching laser 98 on and off at desired times in response to control signals from control circuit 96. FIG. 11 shows graphs of five such control signals, each transmitted to laser 98 during the process of writing one column of the FIG. 10 pattern. In response to the top control signal in FIG. 11, beam 100 is uninterrupted, to cause a continuous line to be written on the target during the relevant scan period. In response to each of the second, third, and fourth control signals from the top in FIG. 11, beam 100 is twice interrupted during the relevant scan, to write three short lines on the target in each of columns 2, 3, and 4 of FIG. 10. In response to the bottom control signal in FIG. 11, beam 100 is interrupted three times, to cause two short lines to be written on the target during the relevant scan period.

To change the thickness of each line written during a scan (i.e., the horizontal dimension of each line in the FIG. 10 pattern), the position of translatably mounted lens 102 along the optical axis is adjusted. This adjustment varies the diameter of the scanned beam at the target position.

In variations on the system of FIG. 9, one or more reflective elements (such as cylindrical or spherical mirrors) can replace each of lenses 102, 106, and 108.

Nor is the invention limited to applications where incremental movement of the target is used to produce the space between written columns of an alphanumeric character. The inventive technique works equally well on continuously moving targets where horizontal movement of the target is negligible during the time taken to write one column of the character. As in the above-described example, the spaces are produced by missing scans (skipping reflective facets) until the target has moved on to the position of the next column of the character.

The inventive technique is also useful in a class of embodiments in which the target moves horizontally a distance of one intercolumn space during the time taken to write one column. In such embodiments, the written columns have a slight slope (with the end of one column being written immediately below the beginning of the next). Preferably, every scan writes a column, and there is no reflective facet skipping. Embodiments of the inventive apparatus for writing dots, as well as embodiments for writing lines, can be operated to write such sloping columns (which can consist of dots arranged in a sloping pattern, or can be continuous sloping line segments).

Various modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. An apparatus for marking a target by exposing the target to continuous wave laser radiation, including:

a means for generating a continuous wave laser beam;

an array of concave mirrors;

a means for scanning the continuous wave laser beam across the array, wherein said means for scanning includes a rotating mirror, and said means for scanning includes a means for reflecting the laser beam from the rotating mirror;

a target positioned relative to the array so that each concave mirror in the array projects a stationary real image of the laser beam on the target when the laser beam is scanned across the array, wherein the stationary real image is projected on the target for a dwell time determined by a rotational velocity of the rotating mirror; and control means, connected to the means for scanning, for controlling the rotational velocity to control the dwell time.

2. The apparatus of claim 1, also including:

laser beam modulation means for modulating the laser beam before said laser beam is scanned across the array of concave mirrors.

3. The apparatus of claim 2, wherein the laser beam modulation means is a shutter device.

4. The apparatus of claim 2, wherein the laser beam modulation means is an acousto-optic modulator.

5. The apparatus of claim 1, also including:

control means, connected to the means for generating the continuous wave laser beam, for supplying control signals to said means for generating the continuous wave laser beam to terminate generation of the laser beam at desired times.

6. The apparatus of claim 1, also including:

control means, connected to the means for generating the continuous wave laser beam, for supplying control signals to said means for generating the continuous wave laser beam to modulate generation of the laser beam at desired times.

7. The apparatus of claim 1, wherein the concave mirrors in the array are oriented so that they project a row of stationary dots on the target.

8. The apparatus of claim 7, wherein the row is oriented in a first direction, and also including means for:

translating the target in a second direction substantially perpendicular to the first direction.

9. The apparatus of claim 1, wherein the rotating mirror is a rotating flat mirror.

10. The apparatus of claim 1, wherein the rotating mirror is a rotating polygonal mirror having reflective facets, and wherein the array of concave mirrors is positioned relative to the rotating polygonal mirror so that radiation reflected from each of the facets scans across the array of concave mirrors as the polygonal mirror rotates.

11. The apparatus of claim 10, also including a secondary array of mirrors positioned so that the radiation reflected from each of the facets re-reflects from the secondary array of mirrors, and the re-reflected radiation then scans at least twice across the array of concave mirrors as the polygonal mirror rotates.

12. The apparatus of claim 1, also including:

a lens system for focusing radiation reflected from the array, wherein the lens system has a magnification selected so that the real image of the laser beam projected on the target has a desired size.

13. The apparatus of claim 1, also including:

means for collimating radiation that has reflected from the array, before said radiation is projected on the target.

14. The apparatus of claim 1, wherein the array of concave mirrors includes individual concave mirrors that are mounted adjacent to each other, with a minimal separation between each pair of adjacent ones of the concave mirrors.

15. The apparatus of claim 1, wherein the array of concave mirrors is a mirror member having a concave front surface consisting of concave reflective portions, wherein the reflective portions are separated by substantially parallel grooves extending through said concave front surface, and wherein the mirror member also includes a flexible back portion through which no grooves extend.

16. An apparatus for marking a target by exposing the target to continuous wave laser radiation, including:

a means for generating a continuous wave laser beam;

an optical element;

a rotating mirror;

a means for projecting the laser beam onto a first point which coincides with a surface of the rotating mirror to produce a reflected beam which propagates away from the rotating mirror, and for scanning the reflected beam across the optical element to produce an output beam which forms a real image of the first point at a stationary image point, wherein a cross-section of the output beam near the real image moves only a short distance during a dwell time, determined by a rotational velocity of the rotating mirror, which can be made sufficiently long to directly mark the target without need for a light sensitive surface or photographic process;

a target positioned relative to the optical element in such a position that the optical element projects a line of laser radiation on the target for said dwell time when the reflected beam is scanned across the optical element; and control means, connected to the rotating mirror, for controlling the rotational velocity to control the dwell time.

17. The apparatus of claim 16, wherein the optical element is a lens system.

18. The apparatus of claim 17, wherein the line has a width, wherein the lens system includes a lens that is translatably mounted along an optical axis between the rotating mirror and said means for generating the continuous wave laser beam, and wherein translation of the lens along the optical axis controls the width of the line.

19. The apparatus of claim 17, wherein the line has a length, wherein the lens system includes a lens mounted along an optical axis between the rotating mirror and the target, and wherein translation of the lens along the optical axis controls the length of the line.

20. The apparatus of claim 16, also including:

control means for controlling operation of the means for generating the continuous wave laser beam, wherein the control means includes ceases generation of the laser beam at desired times.

21. The apparatus of claim 16, wherein the rotating mirror is a rotating polygonal mirror having reflective facets.

22. A system for directly marking information on a target surface in a pattern of dots, wherein the dots are arranged to form columns of dot matrix alpha-numeric characters, including:

a laser which emits a beam of radiation;

means for moving the target surface relative to the laser in a direction substantially perpendicular to the columns;

means for modulating the beam to mark on the target surface, or omit, individual ones of the dots selectively to generate alpha-numeric characters, wherein a projection of the beam at each of the dots remains stationary for a dwell time which can be made sufficiently long to directly mark the target surface without need for a light sensitive surface or photographic process;

means for scanning the beam from a rotating polygonal mirror having facets and an angular velocity, across an array of concave spherical mirrors, so that reflection of the beam from said concave spherical mirrors produces a real image, on the target surface for each of the dots, of a point at which the beam is incident on one of the facets; and means for controlling the dwell time for marking each of the dots on the target surface to match characteristics of said target surface, by varying the angular velocity.

23. The system of claim 22, wherein the laser is an R.F. excited carbon dioxide, and the means for modulating the beam includes means for modulating the beam by directly modulating an R.F. signal supplied to the laser.

24. The system of claim 22, wherein the array of concave spherical mirrors is adjustable to control separation between adjacent ones of the dots in each of the columns.

25. A system for directly marking information on a target surface in a pattern of lines, wherein the lines are arranged to form columns of dot matrix alpha-numeric characters, including:

a laser which emits a beam of radiation;

means for moving the target surface relative to the laser in a direction substantially perpendicular to the columns;

means for modulating a beam of radiation emitted by the laser to selectively mark full lines or shortened lines on the target surface, or omit individual ones of the lines, thereby generating the alpha-numeric characters;

means for scanning the beam from a rotating polygonal mirror having facets and an angular velocity, across a lens system, so that the beam transmitted through the lens system produces a real image of a point at which the beam is incident on one of the facets, wherein a cross-section of the beam near the real image moves only a short distance during a dwell time which can be made sufficiently long to directly mark the target surface without need for a light sensitive surface or photographic process; and means for controlling the dwell time for marking each of the lines on the target surface to match characteristics of said target surface, by varying the angular velocity.

26. The system of claim 25, wherein the laser is an R.F. excited carbon dioxide, and the means for modulating the beam includes means for modulating the beam by directly modulating an R.F. signal supplied to the laser.

27. The system of claim 25, wherein each of the full lines has a length less than fifteen millimeters.

28. The system of claim 25, wherein the lens system includes a lens translatably mounted along an optical axis between the rotating polygonal mirror and the laser.

29. The system of claim 25, wherein the lens system includes a lens translatably mounted along an optical axis between the rotating polygonal mirror and the target surface.

30. A system for directly marking information on a target surface in a pattern of lines, wherein the lines are arranged in columns, including:

a laser which emits a beam of radiation; means for moving the target surface relative to the laser in a direction substantially perpendicular to the columns;

means for modulating a beam of radiation emitted by the laser to selectively mark full lines or shortened lines on the target surface, or omit individual ones of the lines, thereby generating selected arrangements of lines;

means for scanning the beam from a rotating polygonal mirror having facets and an angular velocity, across an optical element, so that the optical element produces a real image of a point at which the beam is incident on one of the facets, wherein a cross-section of the beam near the real image moves only a short distance during a dwell time which can be made sufficiently long to directly mark the target surface without need for a light sensitive surface or photographic process; and means for controlling the dwell time for marking each of the lines on the target surface to match characteristics of said target surface, by varying the angular velocity.

31. A mirror member for use in a laser writing apparatus, including:

a front portion consisting of concave portions, wherein the concave portions are separated by substantially parallel grooves extending through said front portion; and a flexible back portion through which no grooves extend.

32. The mirror member of claim 31, also including:

a reflective coating on each of the concave portions.

33. The mirror member of claim 32, wherein the reflective coating is composed of gold, and wherein the front portion and the flexible back portion are composed of copper.

34. A method for marking a target by exposing the target to continuous wave laser radiation, including the steps of:

(a) scanning a continuous wave laser beam across an array of concave mirrors, by reflecting the laser beam from a rotating mirror;

(b) positioning the target relative to the array so that, during step (a), each concave mirror in the array projects a stationary real image of the laser beam on the target, wherein the stationary real image is projected on the target for a dwell time determined by a rotational velocity of the rotating mirror, and also including the step of:

controlling the rotational velocity to control the dwell time.

35. The method of claim 34, also including the step of:

(c) modulating the laser beam before scanning said laser beam across the array of concave mirrors.

36. The method of claim 35, wherein step (c) includes the step of selectively transmitting the laser beam through a shutter device.

37. The method of claim 35, also including the step of operating a laser to generate the laser beam, and wherein step (c) includes the step of controlling operation of the laser so as to cease generation of the laser beam at desired times.

38. The method of claim 34, wherein the concave mirrors in the array are oriented so that they project a row of stationary dots on the target during step (a).

39. The method of claim 38, wherein the row is oriented in a first direction, and also including the steps of:

(c) after step (b), translating the target in a second direction substantially perpendicular to the first direction; and (d) after step (c), repeating steps (a) and (b).

40. The method of claim 38, wherein the row is oriented in a first direction, and also including the steps of:

(c) after step (b), translating the target in a second direction substantially perpendicular to the first direction;

(d) after step (c), preventing the laser beam from scanning across the array for a selected period of time; and (e) after step (d), repeating steps (a) and (b).

41. The method of claim 34, wherein the rotating mirror is a rotating flat mirror.

42. The method of claim 34, wherein the rotating mirror is a rotating polygonal mirror having reflective facets, and wherein radiation reflected from each of the facets scans across the array of concave mirrors as the polygonal mirror rotates.

43. The method of claim 42, wherein the radiation reflected from each of the facets re-reflects from a secondary array of mirrors, and then scans at least twice across the array of concave mirrors as the polygonal mirror rotates.

44. The method of claim 34, also including the step of focusing radiation reflected from the array through a lens system, wherein the lens system has a magnification selected so that the real image of the laser beam projected on the target has a desired size.

45. The method of claim 34, also including the step of collimating radiation that has reflected from the array, before projecting the radiation on the target.

46. The method of claim 34, wherein the array of concave mirrors includes individual concave mirrors that are mounted adjacent to each other, and wherein there is a minimal separation between each pair of adjacent concave mirrors.

47. The method of claim 34, wherein the array of concave mirrors is a mirror member having a concave front surface consisting of reflective portions, wherein the reflective portions are separated by substantially parallel grooves extending through the concave front surface, and wherein the mirror member also includes a flexible back portion through which no grooves extend, and including the step of:

bending the back portion of the mirror member so as to orient the reflective portions into a position in which they project a row of stationary dots on the target with a desired inter-dot spacing.

48. A method for marking a target by exposing the target to continuous wave laser radiation, including the steps of:

(a) projecting a continuous wave laser beam onto a first point which coincides with a surface of a rotating mirror to produce a reflected beam which propagates away from the rotating mirror;

(b) during step (a), scanning the reflected beam across an optical element to produce an output beam which forms a real image of the first point at a stationary image point, wherein a cross-section of the output beam near the real image moves only a short distance during a dwell time, determined by a rotational velocity of the rotating mirror, which can be made sufficiently long to directly mark the target without need for a light sensitive surface or photographic process; and (c) positioning the target relative to the optical element so that, during step (b), the optical element projects a line of laser radiation on the target, wherein the optical element projects the line on the target for said dwell time, and also including the step of:

controlling the rotational velocity to control the dwell time.

49. The method of claim 48, also including the steps of:
operating a laser to generate the laser beam; and
controlling operation of the laser so as to cease generation of the laser beam at desired times.

50. The method of claim 48, wherein the line of laser radiation is oriented in a first direction, and also including the steps of:

(d) after step (c), translating the target in a second direction substantially perpendicular to the first direction; and (e) after step (d), repeating steps (a), (b) and (c).

51. The method of claim 48, wherein the optical element is a lens system.

52. The method of claim 51, wherein the lens system includes a lens mounted along an optical axis between the rotating mirror and a source of said laser beam, and wherein the line has a width, and including the step of:

translating the lens along the optical axis to control the width of the line.

53. The method of claim 51, wherein the lens system includes a lens mounted along an optical axis between the rotating mirror and the target, and wherein the line has a length, and including the step of:

translating the lens along the optical axis to control the length of the line.

54. The method of claim 51, wherein the rotating mirror is a rotating polygonal mirror having reflective facets, and wherein a reflected beam from each of the facets scans across the lens system as the polygonal mirror rotates.

55. The method of claim 48, wherein the rotating mirror is a rotating flat mirror.

56. A method for marking a target by exposing the target to continuous wave laser radiation, including the steps of:

(a) projecting a continuous wave laser beam onto a first point which coincides with a surface of a rotating polygonal mirror having reflective facets to produce a reflected beam which propagates away from the rotating polygonal mirror;

(b) during step (a), scanning the reflected beam across a lens system to produce an output beam which forms a real image of the first point at a stationary image point, where the stationary image point is a first distance from said lens system, and wherein a reflected beam from each of the facets scans across the lens system as the polygonal mirror rotates; and (c) positioning the target a second distance away from the lens system so that, during step (b), the lens system projects a line of laser radiation on the target, wherein the difference between the first distance and the second distance is much shorter than the first distance, wherein each said reflected beam is re-reflected from a secondary array of mirrors, and then scans at least twice across the lens system as the polygonal mirror rotates.

57. A method for marking a target by exposing the target to continuous wave laser radiation, including the steps of:

(a) projecting a continuous wave laser beam onto a first point which coincides with a surface of a rotating mirror to produce a reflected beam which propagates away from the rotating mirror;

(b) during step (a), scanning the reflected beam across a lens system to produce an output beam which forms a real image of the first point at a stationary image point, where the stationary image point is a first distance from said lens system; and (c) positioning the target a second distance away from the lens system so that, during step (b), the lens system projects a line of laser radiation on the target, wherein the difference between the first distance and the second distance is much shorter than the first distance, wherein the lens system projects the line on the target for a dwell time determined by a rotational velocity of the rotating mirror, and also including the step of:

controlling the rotational velocity to control the dwell time.

58. A method for directly marking information on a target surface in a pattern of dots using a laser, wherein the dots are arranged in columns to form dot matrix alpha-numeric characters and the target surface moves in a direction substantially perpendicular to the columns, the method including the steps of:

(a) scanning the beam from a rotating polygonal mirror having facets and an angular velocity, across an array of concave spherical mirrors, so that reflection of the beam from said concave spherical mirrors projects a real image, on the target surface for each of the dots, of a point at which the beam is incident on one of the facets;

(b) while performing step (a), modulating a beam of radiation emitted by the laser to mark on the target surface, or omit, individual ones of the dots selectively to generate alpha-numeric characters, wherein a projection of the beam at each of the dots remains stationary for a dwell time which can be made sufficiently long to directly mark the target surface without need for a light sensitive surface or photographic process; and (c) controlling the dwell time for marking each of the dots on the target surface to match characteristics of said target surface, by varying the angular velocity.

59. The method of claim 58, wherein the laser is an R.F. excited carbon dioxide, and step (b) includes the step of modulating the beam by directly modulating an R.F. signal supplied to the laser.

60. The method of claim 58, wherein the laser is an R.F. excited carbon dioxide, and step (b) includes the step of transmitting the beam through a shutter device.

61. The method of claim 58, wherein the array of concave spherical mirrors is adjustable to control separation between adjacent ones of the dots in each of the columns, and also including the step of:

adjusting said array of concave spherical mirrors to control separation between said adjacent ones of the dots.

62. The method of claim 58, wherein each of the facets produces one scan across the array of concave spherical mirrors corresponding to marking of one of the columns, and also including the step of:

turning off the laser during unwanted scan periods to adjust width of the marked characters.

63. The method of claim 58, wherein each of the facets produces one scan across the array of concave spherical mirrors corresponding to marking of one of the columns, and also including the step of:

adjusting the angular velocity to match perpendicular movement of the target surface, so as to adjust width of the marked characters.

64. A method for directly marking information on a target surface in a pattern of dots using a laser, wherein the dots are arranged in columns and the target surface moves in a direction substantially perpendicular to the columns, the method including the steps of:

(a) scanning the beam from a rotating polygonal mirror having facets and an angular velocity, across an optical element, so that the optical element projects a real image, on the target surface for each of the dots, of a point at which the beam is incident on one of the facets;

(b) while performing step (a), modulating a beam of radiation emitted by the laser to mark on the target surface, or omit, individual ones of the dots selectively to generate selected arrangements of dots, wherein a projection of the beam at each of the dots remains stationary for a dwell time which can be made sufficiently long to directly mark the target surface without need for a light sensitive surface or photographic process; and (c) controlling the dwell time for marking each of the dots on the target surface to match characteristics of said target surface, by varying the angular velocity.

65. A system for directly marking information on a target surface in a pattern of dots, wherein the dots are arranged in columns, including:

a laser which emits a beam of radiation;

means for moving the target surface relative to the laser in a direction substantially perpendicular to the columns;

means for modulating the beam to mark on the target surface, or omit, individual ones of the dots selectively to generate selected arrangements of dots, wherein a projection of the beam at each of the dots remains stationary for a dwell time which can be made sufficiently long to directly mark the target surface without need for a light sensitive surface or photographic process;

means for scanning the beam from a rotating polygonal mirror having facets and an angular velocity, across an optical element, so that the optical element projects a real image, on the target surface for each of the dots, of a point at which the beam is incident on one of the facets; and means for controlling the dwell time for marking each of the dots on the target surface to match characteristics of said target surface, by varying the angular velocity.

66. A method for directly marking information on a target surface in a pattern of lines using a laser, wherein the lines are arranged to form columns of dot matrix alpha-numeric characters and the target surface moves in a direction substantially perpendicular to the columns, the method including the steps of:

(a) modulating a beam of radiation emitted by the laser to selectively mark full lines or shortened lines on the target surface, or omit individual ones of the lines, thereby generating the alpha-numeric characters;

(b) while performing step (a), scanning the beam from a rotating polygonal mirror having facets and an angular velocity, across a lens system, so that the beam transmitted through the lens system produces a real image of a point at which the beam is incident on one of the facets, wherein a cross-section of the beam near the real image moves only a short distance during a dwell time which can be made sufficiently long to directly mark the target surface without need for a light sensitive surface or photographic process; and (c) controlling the dwell time for marking each of the lines on the target surface to match characteristics of said target surface, by varying the angular velocity.

67. The method of claim 66, wherein each of the full lines has a length less than fifteen millimeters.

68. The method of claim 66, wherein the laser is an R.F. excited carbon dioxide, and step (a) includes the step of modulating the beam by directly modulating an R.F. signal supplied to the laser.

69. The method of claim 66, wherein the laser is an R.F. excited carbon dioxide, and step (a) includes the step of transmitting the beam through a shutter device.

70. The method of claim 66, wherein the lens system includes a lens translatably mounted along an optical axis between the rotating polygonal mirror and the laser, including the step of:

translating said lens along the optical axis to change width of the lines marked on the target surface.

71. The method of claim 66, wherein the lens system includes a lens translatably mounted along an optical axis between the rotating polygonal mirror and the target surface, including the step of:

translating said lens along the optical axis to change character height by changing maximum length of a column.

72. The method of claim 66, wherein each of the facets produces one scan across the lens system corresponding to marking of one of the columns, and also including the step of:

turning off the laser during unwanted scan periods to adjust width of the marked characters.

73. The method of claim 66, wherein each of the facets produces one scan across the lens system corresponding to marking of one of the columns, and also including the step of:

adjusting the angular velocity to match perpendicular movement of the target surface, so as to adjust width of the marked characters.

74. A method for directly marking information on a target surface in a pattern of lines using a laser, wherein the lines are arranged in columns and the target surface moves in a direction substantially perpendicular to the columns, the method including the steps of:

(a) modulating a beam of radiation emitted by the laser to selectively mark full lines or shortened lines on the target surface, or omit individual ones of the lines, thereby generating selected arrangements of lines;

(b) while performing step (a), scanning the beam from a rotating polygonal mirror having facets and an angular velocity, across an optical element, so that the optical element produces a real image of a point at which the beam is incident on one of the facets, wherein a cross-section of the beam near the real image moves only a short distance during a dwell time which can be made sufficiently long to directly mark the target surface without need for a light sensitive surface or photographic process; and (c) controlling the dwell time for marking each of the lines on the target surface to match characteristics of said target surface, by varying the angular velocity.

* * * * *